United States Patent
Woods

[11] 3,786,465
[45] Jan. 15, 1974

[54] RATE ANALYSIS SYSTEM WITH CONSTANT RATE DETECTION CIRCUIT FOR IDENTIFYING LINEAR SIGNALS

[75] Inventor: Thomas C. Woods, Fullerton, Calif.
[73] Assignee: Beckman Instruments, Inc., Fullerton, Calif.
[22] Filed: Apr. 17, 1972
[21] Appl. No.: 244,537

[52] U.S. Cl............................................ 340/248 R
[51] Int. Cl. .......................................... G08b 21/00
[58] Field of Search.................... 340/248, 253, 178, 340/179, 324 A; 343/225; 178/69.6; 328/132

[56] References Cited
UNITED STATES PATENTS
3,184,606    5/1965    Ovenden et al.......... 340/248 R UX Primary Examiner—John W. Caldwell
Assistant Examiner—Daniel Myer
Attorney—James M. Thomson and Robert J. Steinmeyer

[57] ABSTRACT

A rate analysis instrumentation system including a sample cell and detector for producing an electrical cell signal proportional to a parameter of a sample reacting within the cell. In a preferred embodiment the enzyme activity of a sample is measured by detecting the light absorbance characteristics of the sample. A differentiator is utilized to obtain a rate signal from the light absorbance characteristic, and the rate signal is displayed. A constant rate detection circuit is used to measure the rate signal only during periods when the reaction rate and the cell signal are linear. The constant rate detection circuit differentiates the rate signal whereby a second derivative of the cell signal is provided. The second derivative signal is compared in a comparator to a threshold value to determine when the second derivative signal approaches zero. An overrange protection circuit is provided for excluding false rate signals, such as signals having characteristics that fail to meet predetermined acceptable limits.

7 Claims, 4 Drawing Figures

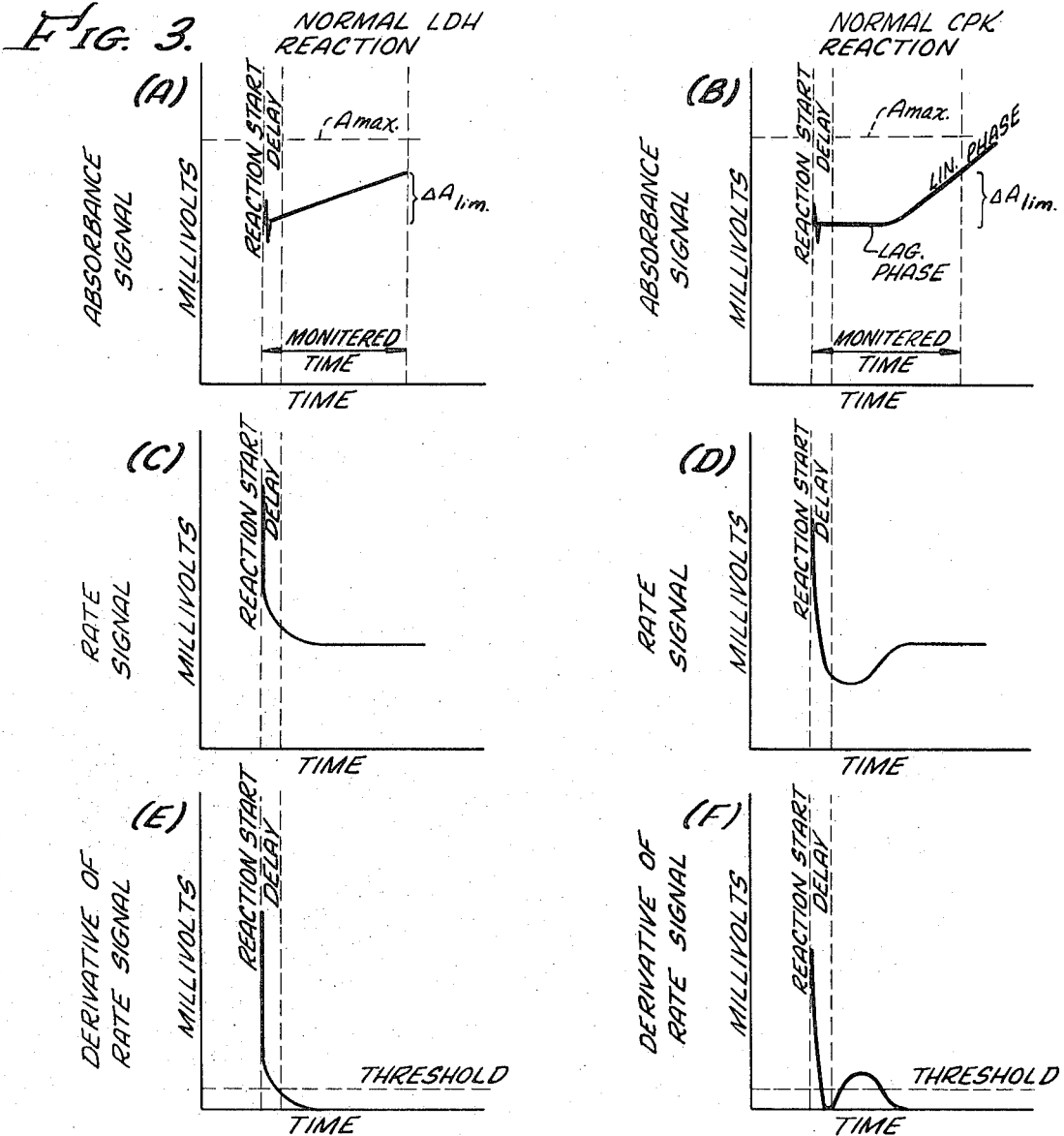

RATE ANALYSIS SYSTEM WITH CONSTANT RATE DETECTION CIRCUIT FOR IDENTIFYING LINEAR SIGNALS

BACKGROUND OF THE INVENTION

The present invention relates to rate analysis instrumentation systems of the type including a sample cell, detection means for providing an electrical cell signal proportional to a parameter of a substance reacting within the sample cell and electrical means for differentiating the cell signal to produce a rate signal. The invention further relates to a constant rate detection system for identifying when the reaction and the cell signal are linear and permitting the measurement and display of only the corresponding constant portion of the rate signal.

Various systems utilize rate analysis of reactions to indicate the levels of parameters of interest. For example, in one type of analysis of blood or urine glucose, blood or urine samples are added to glucose oxidase and the solution is stirred so that a reaction proceeds in the presence of a detector adapted to provide an electrical response which is linear with respect to oxygen concentration. The electrical response is then converted into a signal proportional to the time rate of change of oxygen concentration and this signal is recorded. The maximum recorded signal is utilized to determine the quantity of glucose initially present.

In other types of enzyme assay, samples of buffered enzymes are added to an excess of substrate, again in the presence of a concentration sensor. The electrical response is again converted directly to a time rate of change signal and the signal is recorded with the maximum rate recorded being proportional to enzyme activity.

With certain types of enzyme rate photometric analysis, the light absorbance of an enzyme reaction within a cell is continuously monitored at predetermined light frequency and the electrical cell output of the photomultiplier or other photodetector is differentiated to provide a rate signal. If the constant portion of the rate signal is examined, it reflects the concentration of enzymes within the sample, or the concentration of materials reactive with the enzymes.

In any of the foregoing types of analysis it is possible for the electrical rate signal to exhibit variations and discontinuities when the reaction has not proceeded as expected or the cell signal is not linear. The measurement and display of a rate signal reflecting such variations and discontinuities may provide false results. For example, such false results can occur when a measurement is taken before the reaction has stabilized at a constant rate. Furthermore, depending upon the type of reaction, the reaction rate may follow a linear pattern initially and then diverge from the linear pattern. Finally, it is possible that the cell signal derived from a linear reaction may fall outside an empirically determined acceptable level by being either too high or too low, or by exhibiting a greater total change per unit time than is acceptable.

In view of the above mentioned problems, there is a need for means for determining when a given reaction is linear and for measuring and displaying the rate signal of such a reaction only when it is constant.

OBJECTS OF THE INVENTION

Accordingly, it is an object of the invention to provide a rate analysis instrumentation system which includes a constant rate detection circuit for determining when the derivative of the rate signal is near zero as an indication that the rate signal is constant.

It is another object of the invention to provide, in such a rate analysis instrumentation system, means responsive to the constant rate detection circuit for initiating a predetermined measurement and display cycle.

It is another object of the invention to provide, in such a rate analysis instrumentation system, logic circuit means responsive to the constant rate detection circuit to initiate such a measurement and display cycle, in which data representing the rate signal is accumulated and displayed.

The foregoing and other objects and features of the invention are attained in a rate analysis instrumentation system which includes a sample cell and detection means for producing an electrical cell signal proportional to a parameter of a substance reacting within the sample cell. Electrical means are provided for differentiating the cell signal to produce a rate signal, and means are provided for measuring and displaying the rate signal. A constant rate detection circuit is provided including electrical means for taking the derivative of the rate signal and comparator means for determining when the derivative of the rate signal approaches within a predetermined threshold of zero value. The output of the constant rate detection circuit is provided to a logic circuit which initiates and controls a measurement and display cycle of predetermined duration.

BRIEF DESCRIPTION OF THE DRAWINGS

The foregoing and other objects and advantages of the invention will become apparent from the following detailed description taken in conjunction with the accompanying drawings wherein:

FIG. 3 includes numerous graphs illustrating various waveforms that can occur for certain enzyme reactions in the sample cell of the preferred embodiment of the invention; and FIG. 4 is a chart illustrating one set of signal limits utilized in rate analysis of enzyme reactions in the preferred embodiment.

DETAILED DESCRIPTION OF THE INVENTION

Figure 1:
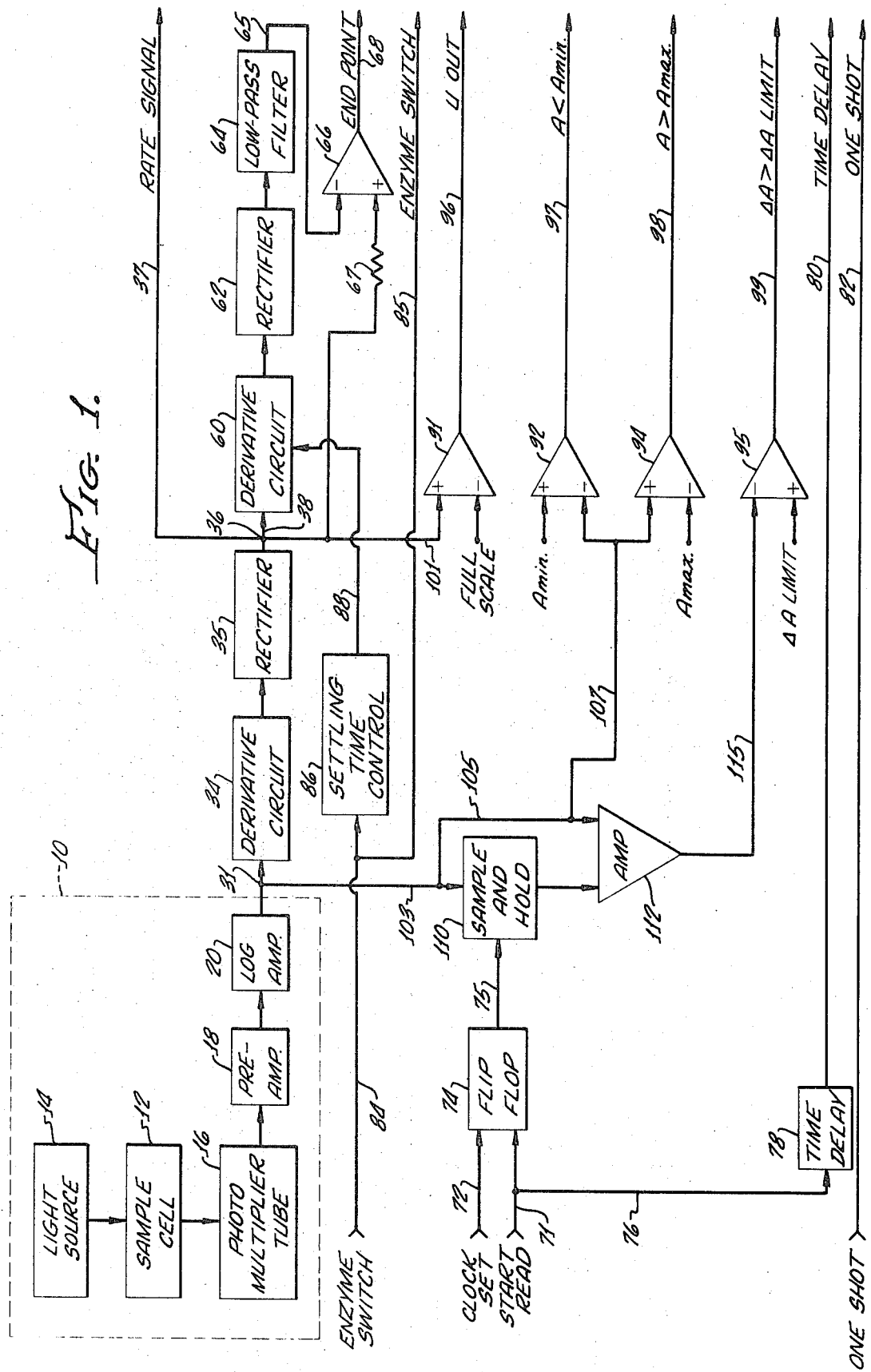
FIG. 1 is a schematic diagram of one portion of a preferred embodiment of the invention.

The preferred embodiment of the invention comprises a rate analysis instrumentation system specifically adapted for monitoring enzyme reactions to determine enzyme activity. In particular, the preferred embodiment is designed to sense and perform rate analysis upon an electrical signal that is proportional to the light absorbance of an enzyme reaction in a sample cell as an indication of the activity of enzymes, and particularly the enzymes LDH, SGOT, SGPT, HBDH, CPK, and AP. However it should be apparent that the preferred embodiment is exemplary in this regard and is not limited to rate analysis of these enzymes or rate analysis of enzymes in general. Rather the invention can be utilized with any rate analysis system where it might be useful to determine when a rate signal becomes constant. Such a system need not include means for sensing light absorbance. Rather, any other sensing means that produces an electrical signal to be analyzed can be utilized with the preferred embodiment.

Referring now to FIG. 3 a number of waveforms are illustrated which will facilitate an understanding of the preferred embodiment. Graphs A, C and E relate to a reaction involving an enzyme such as the enzyme LDH, monitored over a predetermined reaction time as indicated. Graph A illustrates the absorbance signal in millivolts vs. time of the reaction. As is apparent, the absorbance signal is an analog electrical signal which increases on a linear scale beginning from the start of the reaction and remaining linear over the entire monitored time of the reaction. Furthermore the absorbance signal reaches a certain millivolt level at the end of the monitored time and includes a total change $\Delta A$ during the monitored time as indicated on chart A.

Graph C illustrates the first derivative of the absorbance signal, i.e., the rate signal for a corresponding period of time of the same reaction. As shown, the rate signal shows a momentary instability at the start of the reaction due to mixing transients and then declines to a constant level. This phenomena should be expected since the absorbance signal is linear.

Graph E illustrates the derivative of the rate signal, i.e., the second derivative of the absorbance signal. As shown the derivative of the rate signal, after the momentary instability at the start the reaction declines toward zero, passing through a threshold value soon after the time line marked delay. This performance is, again, expected since when the rate signal is constant the derivative of the rate signal is zero.

Referring to graphs B, D and F, characteristics of a CPK reaction are illustrated. In graph B the absorbance signal derived from the reaction is shown in solid outline. As shown, the signal characteristic is constant or nearly constant for a significant time after the start of the reaction and then begins to increase during a middle portion of the reaction before stabilizing in a linear phase.

The corresponding rate signal is illustrated in graph D where it can be seen that after the momentary instability at the start of the reaction, the rate signal declines significantly below its final value and then increases to a higher constant rate during the linear portion of the reaction.

In similar fashion, as shown in graph F, the derivative of the rate signal begins with a momentary instability at the start of the reaction, and then declines to zero, followed by an increase significantly above the threshold value before returning to zero when the rate signal becomes constant.

The variations exhibited by the waveform characteristics illustrated in graphs of FIG. 3 are utilized in controlling the preferred embodiment of the invention to identify and exclude rate signals derived from or corresponding to abnormal types of reactions.

For example, referring again to chart A, the horizontal dotted line designated $A_{max}$ represents the maximum acceptable absorbance signal of a normal reaction, whereas the bracketed portion of the curve, designated $\Delta A_{limit}$ represents the maximum acceptable change in the absorbance signal over the monitored time of the reaction. If the reaction characteristic falls outside either of the boundaries during the monitored time, the rate signal corresponding thereto will not be displayed. In addition the reaction characteristic considered in chart A can exhibit an unacceptable change per unit time which is detected and used in the preferred embodiment to prevent the display of the rate signal.

In similar fashion, the CPK reaction characterized in chart B can produce an absorbance signal exhibiting an unacceptably high level over the monitored time of the reaction. In addition the CPK signal can exhibit an unacceptable change per unit time. If any of these conditions occur in the preferred embodiment, they are detected and used to prevent the display of the rate signal.

The charts illustrated in FIG. 3 are exemplary of the general characteristics of reactions that are obtained with the enzymes LDH and CPK, as well as other of the enzymes identified hereinbefore. However it should be understood that certain other enzymes exhibit differing characteristics. For example, certain of the enzymes exhibit absorbance signal characteristics that decline at a linear rate rather than increase. In addition, other enzymes can exhibit downgoing lag phase signals, as well as deceleration phase signals.

Furthermore the normal characteristics of the various enzymes dealt with in the preferred embodiment do not all exhibit the same reaction rates. Accordingly, the acceptable limits or characteristics of a normal reaction relating to each of the six enzymes identified above have been determined by empirical and other methods. FIG. 4 illustrates the acceptable parameters which are utilized in the preferred embodiment of the invention to identify and exclude rate signals derived from abnormal reactions. The manner in which this is accomplished will be explained in detail hereinafter in conjunction with the circuitry of the preferred embodiment. However it should be understood that the preferred embodiment can be utilized in conjunction with enzymes other than those identified above, and it can be utilized in conjunction with rate analysis relating to non-enzyme reactions.

Figure 2:
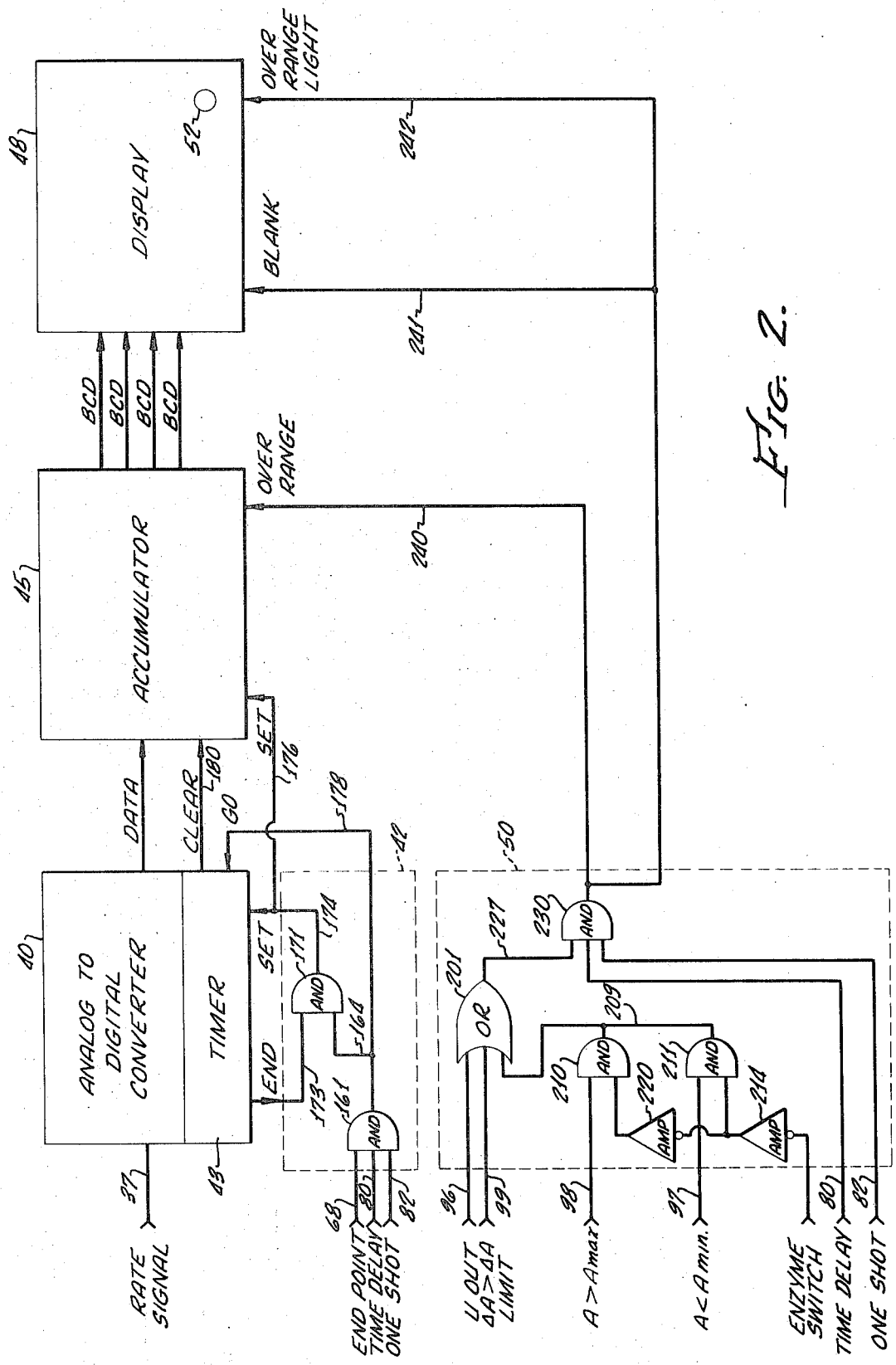
FIG. 2 is a schematic diagram of another portion of the preferred embodiment related to FIG. 1.

Referring now to FIGS. 1 and 2 one preferred embodiment of the invention is illustrated comprising an analyzer 10 including a sample cell 12 adapted to confine a sample of reactive solution containing enzymes to be assayed. The analyzer further includes a monochromated light source 14 adapted to direct a beam through the sample cell, and a photomultiplier tube or other detector array 16 adapted to detect the light passing through the cell. These components are exemplary of a single beam type absorption analyzer of conventional nature. However it should be realized that a double beam system could be utilized as well without departing from the invention. A preamplifier 18 is provided within the analyzer, receiving the output of the photomultiplier tube, and a log amplifier 20 is also provided, receiving the output of preamplifier 18. The output of the analyzer is provided on output terminal 31 and comprises an electrical signal which is proportional to the light absorbance of the sample. A log signal is utilized since the photomultiplier output signal corresponds to the light transmittance of the sample and absorbance is related to the logarithm of transmittance. The resulting signal at output terminal 31 exhibits all the properties of sample absorbance, including a linear change with respect to time for simple first-order chemical reactions in cell 12.

The instrumentation system otherwise includes a derivative circuit 34 that receives the absorbance signal from the analyzer and differentiates it. The output of derivative circuit 34 is of either positive or negative polarity. Consequently a rectifier 35 is provided that receives and rectifies the bi-polar derivative signal. Both the derivative circuit and the rectifier are conventional circuits. The output of rectifier 35 is provided to a terminal 36 and comprises a rate signal which is proportional to the time rate of change of light absorbance of the sample. The rate signal is provided via a conductor 37 to associated circuitry of FIG. 2 in a manner explained hereinafter.

A constant rate detection circuit is also illustrated in FIG. 1 comprising a derivative circuit 60 which receives the rate signal from terminal 36 via conductor 38. Derivative circuit 60 is of conventional design and produces an output which represents the derivative of the rate signal, i.e., the second derivative of the absorbance signal.

A settling time control circuit 86 is provided which receives an Enzyme Switch input signal via conductor 84, from a suitable instrument programmer not illustrated. The enzyme switch signal is preferably a digital voltage level which has a predetermined amplitude and is related to a selected enzyme. In response to the Enzyme Switch signal, the settling time control circuit produces an output which is supplied via conductor 88 to derivative circuit 60. The settling time output signal controls the "fall time" of the derivative circuit to determine the rate at which the derivative output approaches its final value. It is necessary to momentarily delay the fall time of circuit 60 by differing amounts to allow the reactions involving the various enzymes a predetermined settling time to reach a stable reaction condition. For example, referring to FIG. 4, the enzyme LDH requires a short settling time, whereas the enzymes SGOT and SGPT require medium settling times. The enzyme switch signal is also provided directly to logic circuits of FIG. 2 via a conductor 85.

A rectifier 62 receives the output of the derivative circuit and rectifies the derivative signal. A low pass filter 64 receives the rectified derivative signal and filters out all but the low frequency components thereof.

A conventional comparator 66 is provided having negative and positive input terminals. The output of filter 64 is connected to the negative input terminal of the comparator. The comparator receives at its positive or reference input terminal a signal which is derived from terminal 36 and which has a magnitude determined by the impedance of an input resistor 67. Comparator 66 also has an internal reference signal associated with the positive or reference input terminal, such as the output of a zener diode, for example. Comparator 66 compares the output of low pass filter 74 with a reference or threshold voltage that is the sum of the zener voltage and the input voltage from resistor 67. The comparator produces a high output if the derivative input signal is less than or equal to the threshold value established by the reference input. If the second derivative signal is greater than the reference value the comparator produces a low output. The threshold value is depicted on graphs E and F of FIG. 3 wherein it can be seen that the threshold value is slightly greater than zero. It should be apparent that the threshold value will vary somewhat due to the changing rate signals for the various enzymes, as applied through input resistor 67. The output of comparator 66 is designated as an End Point signal and is supplied via conductor 68 to a constant rate logic circuit illustrated in FIG. 2, as is explained hereinafter.

An overrange detection circuit is also illustrated in FIG. 1 which is actuated by a Start Read signal. The Start Read signal is also received from the instrument programmer, via a conductor 71. Conductor 71 is connected to one input of a control flip-flop 74 which also receives a Clock Set signal from the programmer at an appropriate interval via a conductor 72. The flip-flop produces a high level output in response to high level Clock Set and Start Read signals. The Start Read signal is also provided via conductor 76 to a time delay circuit 78. Time delay circuit 78 receives the Start Read signal, delays it and produces a Time Delay signal output on conductor 80 which is ultimately connected to a constant rate logic circuit and an overrange logic circuit illustrated in FIG. 2.

The overrange detection circuit otherwise includes a sample and hold circuit 110 that receives the absorbance signal from terminal 31 via conductor 103. Circuit 110 also receives a control signal from flip-flop 74 via conductor 75. The sample and hold circuit is of conventional design and produces, at a predetermined internal delay time period after the control signal is received from flip-flop 74, an output signal which is identical in amplitude to the input signal received from terminal 31. The output of the sample and hold circuit is provided as one input to a differential amplifier 112. The differential amplifier receives the absorbance signal from terminal 31 directly at its other input terminal via conductors 103, 105. Accordingly the differential amplifier produces an output signal on conductor 115 which is proportional to the total change in the level of the absorbance signal that occurs during the internal delay period of circuit 110. In the preferred embodiment the internal delay of circuit 110 is set at slightly less than 13 seconds for reasons that are apparent hereinafter.

A One Shot signal is also received from the programmer on conductor 82 and is ultimately connected to the constant rate logic circuit and the overrange logic circuit for timing and control purposes explained hereinafter.

Also illustrated in FIG. 1 are a plurality of conventional comparator circuits 91, 92, 94 and 95. The comparators are of conventional design and each is adapted to receive a positive and a negative input signal and to provide a high level output only when the amplitudes of the input signals are appropriate. Comparator 91 receives a rate signal input from terminal 36 via conductor 101. The comparator also receives a full scale voltage input on its negative input terminal from an adjustable voltage source not illustrated. The full scale value is selected to represent the full scale value of a display circuit illustrated in FIG. 2. A high level output from comparator 91 is designated as a U-out signal and is connected via conductor 96 to the logic circuits of FIG. 2. A ten volt input to the reference input of comparator 91 represents a full scale value of 2,000 mIU for the rate signal.

Comparators 92, 94 each receive the absorbance signal from terminal 31 via conductors 103, 105, 107. In addition, comparator 92 receives a variable input voltage $A_{min}$ on its other input terminal. The $A_{min}$ signal approximates a minimum millivolt level of an acceptable absorbance signal from an enzyme having a declining absorbance signal characteristic. Such declining characteristics exist for the enzymes SGOT, SGPT and HBDH as is apparent from FIG. 4, which illustrates the appropriate comparative $A_{min}$ values for these enzymes. Comparator 92 produces a high level output on conductor 97 when the absorbance signal input to the comparator reaches a level equal to or below the $A_{min}$ input. At all other times the output of comparator 92 assumes a low level.

Comparator 94, on the other hand, receives a variable reference input voltage $A_{max}$ on its negative input terminal which approximates the maximum millivolt level of an acceptable absorbance signal from an enzyme having an increasing characteristic. Such increasing characteristics occur with reactions involving the enzymes LDH, CPK and AP, as is apparent from the chart illustrated in FIG. 4 which illustrates the appropriate comparative $A_{max}$ values for these enzymes. Comparator 94 is adapted to provide a high level output when the absorbance signal is equal to or higher than the $A_{max}$ input and exhibits a low level output at all other times. The output of comparator 94 is supplied via conductor 98 to the logic circuits of FIG. 2.

Comparator 95 receives the output of amplifier 112 as a sample input. The reference input, or positive input terminal of comparator 95 receives a $\Delta A$ limit signal which represents the total millivolt change of an acceptable absorbance signal, whether it be of declining or increasing characteristic. The $\Delta A$ limit has been defined to be .65 for the enzymes SGPT, SGOT and HBDH; whereas the $\Delta A$ limit has been defined to be 1.3 for the enzymes LDH, CPK and AP, as is apparent from the chart illustrated in FIG. 4. Comparator 95 produces a high level output when the actual change in absorbance exceeds the reference or acceptable change represented by $\Delta A$ limit. The output of comparator 95 is supplied via conductor 99 to the logic circuits of FIG. 2. In the embodiment illustrated the reference input voltages to the comparators are related to the $A_{min}$, $A_{max}$ and $A_{limit}$ values by the relationship 5 volts = 2A.

Referring now to FIG. 2, the rate signal is supplied from terminal 36 via conductor 37 to the input of an analog-to-digital converter 40. Analog-to-digital converter 40 is of conventional design and is adapted to receive the rate signal and produce a digital pulse output responsive thereto. The converter includes and is controlled by an internal timer 43 which allows the digital output pulses to pass during a predetermined 13 second measurement cycle and then interrupts the output pulses. The timer is started by a GO signal received from the constant rate logic circuit 42 in a manner described hereinafter. At the end of the 13 second measurement cycle the timer produces an END signal which is supplied to logic circuit 42. The logic circuit generates a SET signal to reset the timer in response to the END pulse. A measurement cycle of thirteen seconds has been found to be a suitable period for averaging the rate signal for the enzyme reactions described in the application. By averaging the output of the converter over a given measurement cycle, variations in the output due to noise and other factors are minimized. It should be apparent that other measurement cycles can be utilized in conjunction with the circuit described herein without departing from the scope of the invention.

The accumulator also receives a CLEAR pulse from timer 43 at the beginning of each measurement cycle, and a SET pulse from circuit 42 at the END of each measurement cycle.

The digital output of the converter is supplied to an accumulator 45 which includes a plurality of registers adapted to accumulate the output pulses. The accumulator is of conventional design and produces binary coded outputs on a plurality of BCD output terminals. The binary coded decimal output signals are provided to a display 48 in response to the SET pulse. The display preferably comprises a lighted numerical display including a plurality of seven-segment readout tubes, with each tube being energized by a different BCD output signal. However it should be apparent that other types of displays could be utilized or that a printer or recorder could be utilized for displaying the rate signal output, if desired.

Display 48 is adapted to receive Blank signals from overrange logic circuit 50 which will cause the display to be blanked or inoperative. In addition, upon the occurrence of the Blank signal an overrange light 52 on the display is illuminated.

Constant Rate logic circuit 42 includes a three input AND gate 161 adapted to receive the End Point signal on one input via conductor 68 and the Time Delay signal as an enabling signal on another input via conductor 80. AND gate 161 receives the One Shot signal as an enabling signal at its other input terminal via conductor 82. The output of AND gate 161 is provided via a conductor 164 to one input terminal of a dual input AND gate 171. The END signal from timer 43 is provided via conductor 173 as the other input to AND gate 171. The output of gate 171 comprises the SET signal which is provided via a conductor 174 to the timer and via conductors 174, 176 to accumulator 45. The output of AND gate 161 comprises the GO signal which is provided via conductor 178 to the timer. The Clear signal is provided from the timer to accumulator 45 via conductor 180. All of the AND gates are adapted to produce high level outputs only in response to high level input signals.

Overrange logic circuit 50 is illustrated as including a three input OR gate 201 adapted to receive a first input signal via conductor 96 comprising the U-out signal from comparator 91. Gate 201 also receives, as its second input via conductor 99, the $\Delta A$ limit signal comprising the output of comparator 95. The third input to gate 201 comprises a signal via conductor 209 from a dual input AND gate 210 or a dual input AND gate 211. Gate 211 receives the $A_{min}$ signal from comparator 92 via conductor 97. Gate 210 receives the $A_{max}$ signal from comparator 94 via conductor 98. An enabling circuit for gates 210, 211 includes inverting amplifiers 214, 220. Inverting amplifier 214 receives the Enzyme Switch signal via conductor 85 and inverts it. Consequently an Enzyme Switch signal of low level produces a high level output from amplifier 214 which enables AND gate 211. However, the output of amplifier 214 is provided as the input to inverting amplifier 220, and the output of amplifier 220 is provided as the enabling input to AND gate 210. Therefore, an Enzyme Switch signal of high level is inverted by amplifier 214 and inverted again by amplifier 220 whereby an enabling signal of high level is provided to AND gate 210.

A three input AND gate 230 is also provided receiving one of its input signals from OR gate 201 via a conductor 227, and another of its input signals via conductor 80 comprising the Time Delay signal. The other enabling input signal to gate 230 is the One Shot signal received via conductor 82. The output of AND gate 230 comprises the Overrange signal and is supplied via conductor 240 to the accumulator. The output of gate 230 is also utilized as the Blank signal and Overrange light signal which are provided, respectively, via conductors 241, 242 to display 48.

The operation of the embodiment illustrated in the drawings will now be explained, with it being understood that appropriate controls and control signals are provided, forming no part of the invention, to initiate the sequence of injecting and/or inserting the sample cell between the light source and photomultiplier tube and otherwise initiating the programming of the instrument necessary to initiate the sampling procedures of the analyzer. Upon initiation of the sampling procedures an output signal is received from log amplifier 20 which comprises an analog signal proportional to the light absorbance of the material within the sample cell. A derivative operation is performed upon this electrical signal by circuit 34 and the rate signal output is provided to analog-to-digital converter 40.

The purpose of the preferred embodiment is to display a numerical value proportional to the rate signal. Accordingly the analog-to-digital converter output is supplied to accumulator 45 and subsequently to display 48. However, it is desired to display only the average value of a rate signal which has remained relatively constant over a predetermined measurement interval, since a constant rate signal is an indication that the absorbance signal is linear. It has been found that measurements taken with a linear absorbance signal are desirable since they reflect that the reaction being assayed has assumed a linear reaction rate.

The electrical rate signal includes some noise components, and to ensure that an accurate measurement of the rate signal is obtained, it is desirable to average the rate signal over a predetermined interval. In the embodiment described, the rate signal is measured or averaged over a thirteen second measurement interval as determined by the timer. If the other built in limitations of the system are satisfied the data supplied from the converter to the accumulator during this thirteen second period is then passed to display 48 where it is numerically displayed. The constant rate detection and logic circuits function to ensure that the rate signal has become constant prior to the time that a measurement cycle is initiated. Accordingly the rate signal is supplied to derivative circuit 60 which effects a derivative operation upon the rate signal and provides an output which is proportional to the second derivative of the absorbance signal. The value of the second derivative signal is monitored as an indication of when the rate signal is constant, i.e., when the first derivative assumes a constant value the second derivative signal is zero.

The output of comparator 66 assumes a low value until the derivative of the Rate Signal is equal to or lower than the threshold or reference voltage. Then the output of comparator 66 assumes a high value which is supplied to AND gate 161. The output of comparator 66 remains high so long as the End Point signal is within the threshold value of zero.

The Start Read signal provided from the programmer is supplied to time delay circuit 78. Circuit 78 delays the Start Read signal for an appropriate time and then provides a Time Delay signal output which is supplied as the second input to AND gate 161 enabling the gate. The purpose of the Time Delay signal is to prevent the Constant Rate logic circuit from providing a positive output signal for a predetermined time after the reaction has been initiated as represented by the delay line in graph C of FIG. 3.

The One Shot signal provided from the programmer comprises another enabling input to AND gate 161. Accordingly the presence of a high level End Point signal, a high level Time Delay signal and a high level One Shot signal produces a high level GO signal from the logic circuit 42 to the timer. The GO signal remains high as long as all three signals remain high. The GO signal initiates the 13 second measurement cycle of the timer, which sends a Clear signal to the accumulator to clear any data from the previous operation therefrom. If during the 13 second interval the GO signal is removed from the timer, the measurement cycle is interrupted. However, if the 13 second measurement cycle proceeds to completion, the timer produces an END signal which is supplied to AND gate 171. Since the One Shot signal and GO signal are present to enable gate 171, it provides the SET signal to the timer and to accumulator 45. This signals the termination of the measurement cycle and resets the timer. It also causes the accumulated data to be unloaded from the accumulator to the display. Thus it should be apparent that the constant rate detection and logic circuit ensures that the rate signal is measured and displayed only when it is constant.

In the case of an abnormal reaction producing a rate signal which exceeds an acceptable change per unit time, i.e., the full scale value, comparator 91 produces the U-out sgnal which is supplied to OR gate 201 of the overrange logic circuit. OR gate 201 produces a high output in response thereto which is supplied to AND gate 230. The Time Delay signal and the One Shot signal enable AND gate 230. Accordingly, upon the occurrence of the U-out signal at any time after the time delay period, AND gate 230 assumes a high output which is supplied as the Overrange signal to accumulator 45. In addition the output of gate 230 is provided as a Blank signal to display 48 to blank the display and as the Overrange light signal to illuminate light 52 on the display.

In similar fashion the occurrence of an absorbance signal which exceeds the selected acceptable $A_{min}$ or $A_{max}$ value for the appropriate enzyme is detected and passed by OR gate 201 whereby the Overrange and Blank signals are supplied to the accumulator and display, respectively.

Sample and hold circuit 110 and amplifier 112 serve to produce an input to comparator 95 which is proportional to the total change in absorbance signal that occurs over a given period of time as determined by the built in time delay characteristic of circuit 110. The acceptable $\Delta A$ limit for a given enzyme is automatically selected by an enzyme switch on the front panel and an appropriate voltage is supplied to the positive input of comparator 95 corresponding to the selected $\Delta A$ limit. Accordingly the comparator produces a high output level when the actual change in absorbance exceeds the acceptable limit. In that event, the high output of comparator 95 is supplied to OR gate 201 whereby Overrange and Blank signals are sent to the accumulator and display, respectively, in the manner previously explained.

In the event that none of the outputs of comparators 91, 92 and 94, 95 are at appropriate levels during the measurement period, the accumulator output is supplied to activate display 48 at the end of the measurement cycle whereby the rate signal is displayed.

It should be apparent that the visual display of display 48 can comprise numerals proportional to the millivolt level of the rate signal. However, it is also possible to calibrate the display in terms of the actual concentration levels of the enzymes under study, or in terms of the concentration of other compounds which are reactive with the enzymes or with still other compounds.

It should be apparent that the foregoing embodiment provides an improved rate analysis instrumentation system that permits the measurement of the rate signal at a time when it is constant. The system described is reliable and provides significant protection against the display of false signals in an automatic system.

What is claimed is:

1. A rate analysis instrumentation system including electrical first derivative circuit means, adapted to receive an electrical sample signal to be rate analyzed, for producing an electrical rate signal therefrom, display means connected to said first derivative circuit means for selectively displaying a value proportional to said rate signal, electrical second derivative circuit means connected to said first derivative circuit means for producing an electrical derivative of the rate signal, and logic circuit means responsive to said second derivative circuit means for permitting the display of said rate signal value only when the derivative of the rate signal assumes predetermined limits.

2. The rate analysis instrumentation system of claim 1 wherein the logic circuit means includes a comparator adapted to receive the output of said second derivative circuit means at one input terminal and a threshold voltage at another input terminal for producing an output only when said derivative of the rate signal is equal to or less than the threshold input.

3. The rate analysis instrumentation system of claim 2 wherein said threshold input voltage to the comparator is set at a predetermined variable value.

4. The rate analysis instrumentation system of claim 2 wherein said logic circuit means further includes at least one AND gate adapted to be enabled by a time delay signal from an instrument programmer for passing the output of said comparator signal only at a predetermined time delay interval after the rate signal is initiated.

5. The rate analysis instrumentation system of claim 4 further including signal converter and timer means adapted to receive the rate signal, for timing a predetermined measurement interval in response to a signal from said AND gate to average said rate signal over said predetermined timing cycle and then supply said averaged value to the display.

6. A rate analysis instrumentation system including electrical first derivative circuit means adapted to receive an electrical signal to be rate analyzed for producing an electrical rate signal therefrom, an analog-to-digital converter adapted to receive said rate signal and produce a digital pulse output in response thereto, timer means providing a measurement cycle of predetermined interval for controlling said analog-to-digital converter, display means connected to said analog-to-digital converter to selectively display the output thereof, electrical second derivative means connected to said first derivative circuit means for producing an electrical derivative of the rate signal, comparator means having a sample input terminal and a reference input terminal, said comparator receiving the derivative of the rate signal at the sample input terminal and receiving a threshold reference voltage at the reference input terminal, said comparator producing an output only when the derivative of the rate signal is equal to or less than the threshold input voltage, and circuit means adapted to receive the output of said comparator for producing a GO signal to start the measurement cycle of said timer only when the derivative of the rate signal is within the predetermined threshold limits.

7. The rate analysis instrumentation system of claim 6 wherein said circuit means includes a first dual input AND gate adapted to receive the output of the comparator and a time delay signal as inputs for passing said comparator output signal only at a predetermined time delay after the reception of the rate signal in said instrumentation system, and a second AND gate means adapted to receive an output signal from said timer at the end of the measurement cycle for producing a set signal to set said timer and then said display for a subsequent measurement cycle.

* * * * *